United States Patent
Bremont et al.

(10) Patent No.: US 7,067,032 B1
(45) Date of Patent: Jun. 27, 2006

(54) TUBULAR COUPLING ELEMENT FOR PRODUCING A GLUED JOINT WITH A FLUID LINE

(75) Inventors: Michel Bremont, Attenschwiller (FR); Cyrille Dalla Zuanna, Grenoble (FR); Yves Papirer, Rixheim (FR); Erminio Moretti, Grenoble (FR); Gilles Perrin, Echirolles (FR); Albert Raymond, Claix (FR)

(73) Assignee: A. Raymond & CIE, Grenoble (FR)

( * ) Notice: Subject to any disclaimer, the term of this patent is extended or adjusted under 35 U.S.C. 154(b) by 94 days.

(21) Appl. No.: 10/088,575

(22) PCT Filed: Sep. 9, 2000

(86) PCT No.: PCT/EP00/08824

§ 371 (c)(1),
(2), (4) Date: May 10, 2002

(87) PCT Pub. No.: WO01/21996

PCT Pub. Date: Mar. 29, 2001

(30) Foreign Application Priority Data

Sep. 21, 1999 (DE) ................................ 199 45 218

(51) Int. Cl.
*B29C 65/32* (2006.01)
*B29C 65/40* (2006.01)
*F16L 13/10* (2006.01)
*F16L 47/02* (2006.01)

(52) U.S. Cl. .............. 156/272.2; 156/275.7; 156/293; 156/294; 156/322; 285/21.1; 285/22; 285/423; 285/915

(58) Field of Classification Search ............ 156/272.2, 156/274.4, 273.9, 275.7, 293–294, 322; 285/21.1, 285/21.2, 22, 331, 423, 915
See application file for complete search history.

(56) References Cited

U.S. PATENT DOCUMENTS

| 1,921,642 A | * | 8/1933 | Stephenson ................ 285/331 |
| 3,910,448 A | * | 10/1975 | Evans et al. ................ 220/3.8 |
| 4,092,193 A | | 5/1978 | Brooks |
| 4,400,019 A | * | 8/1983 | Fruck ........................ 285/331 |

(Continued)

FOREIGN PATENT DOCUMENTS

DE    2603299    *    8/1977

(Continued)

OTHER PUBLICATIONS

Abstract for Europe 289831.*

(Continued)

*Primary Examiner*—Steven D. Maki
(74) *Attorney, Agent, or Firm*—Gifford, Krass, Groh, Sprinkle, Anderson & Citkowski, P.C.

(57) ABSTRACT

A tubular coupling element for producing a glued joint with a fluid line and a method for producing such a glued joint. The coupling element includes an inner tube that is insertable into a fluid line and an outer tube that is constructed concentric to the inner tube and integrally connected to the rear end of the inner tube by a connecting wall. An annular gap is present between the two tubes and is designed to receive an end section of the fluid line and a hot-melt type adhesive in a compacted solid form shaped as a ring. A connection between the coupling element and the fluid lines can be easily established by first introducing the adhesive in the annular gap and then melting it by rapidly supplying heat while the end section of the fluid line is pressed into the annular gap of the coupling element.

15 Claims, 1 Drawing Sheet

U.S. PATENT DOCUMENTS

| | | | |
|---|---|---|---|
| 4,896,904 A | | 1/1990 | Gadsden |
| 5,150,922 A | * | 9/1992 | Nakashiba et al. ........ 285/21.2 |
| 6,627,036 B1 | * | 9/2003 | Suendermann .............. 156/322 |

FOREIGN PATENT DOCUMENTS

| | | | |
|---|---|---|---|
| DE | 4442407 | * | 11/1996 |
| DE | 19521583 | * | 12/1996 |
| EP | 0289831 | | 9/1988 |
| FR | 1493562 | * | 9/1967 |
| GB | 2133496 | * | 7/1984 |
| JP | 5-187590 | * | 7/1996 |
| WO | WO 98/53241 | * | 11/1998 |
| WO | WO 99/29491 | * | 7/1999 |

OTHER PUBLICATIONS

Machine translation for German 19521583.*

Foscaldi et al, "Adhesive-Bonded Structural Joint", IBM Technical Disclosure Bulletin, vol. 12, No. 4, p. 507, Sep. 1969.

* cited by examiner

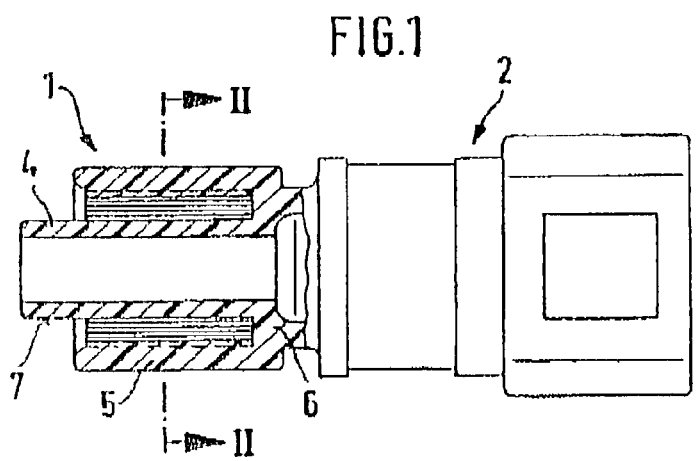
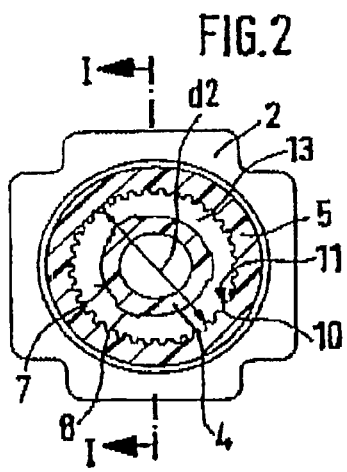
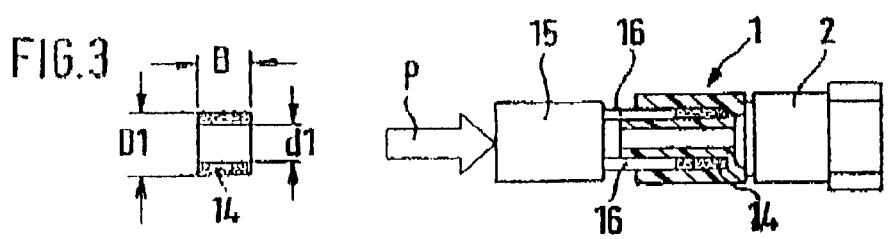
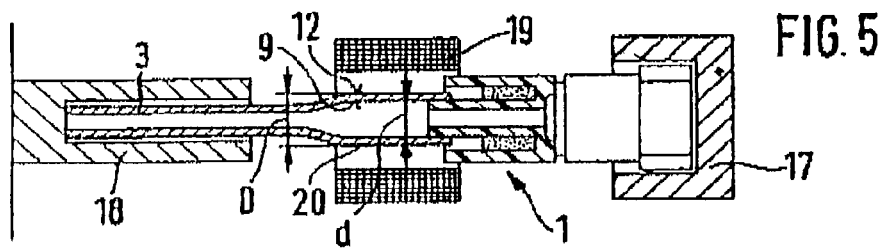
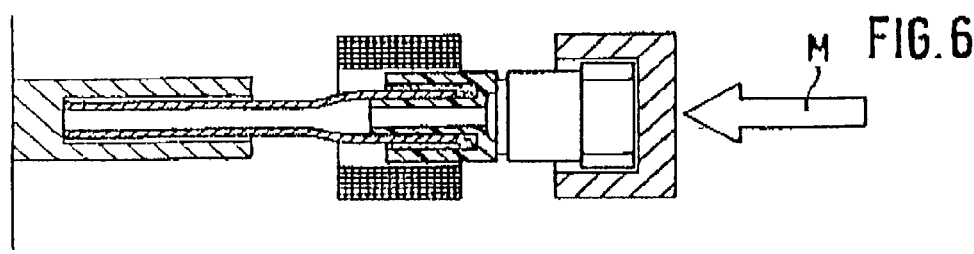
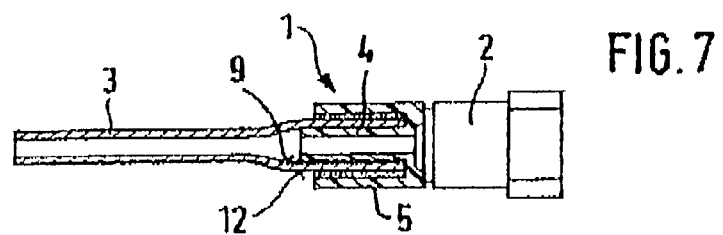

TUBULAR COUPLING ELEMENT FOR PRODUCING A GLUED JOINT WITH A FLUID LINE

BACKGROUND OF THE INVENTION

1. Field of the Invention

The invention pertains to a tubular coupling element for producing a glued joint with a fluid line. The coupling element includes an inner tube that can be inserted into a fluid line and an outer tube that is concentric to the inner tube and integrally formed on the rear end of the inner tube with a closed ring.

2. Reference to Related Art

A coupling element is known from DE 26 03 299 A1. In that case, an annular gap between an inner tube and an outer tube is filled with a liquid adhesive so that the respective intermediate spaces between the fluid line and the inner tube and the outer tube are entirely filled out after the fluid line is inserted. The adhesive has two liquid components that are held in the annular gap by removable cover films. The utilization of liquid adhesive components has the disadvantage in that the films initially need to be removed at the construction site before the tubular end of the fluid line can be inserted into the annular gap. In addition, the tubular end of the fluid line and the coupling element need to be held in an axially aligned position until the adhesive has hardened. One also needs to proceed very carefully when filling in the annular gap with the adhesive components by correctly metering the components and by sealing the annular gap in an air-tight fashion.

A tubular coupling element is also known from DE 44 42 407 C1. In that case, an annular gap is filled with a hardenable sealing or binding agent and then closed with a removable air-tight cover. However, this method also results in the aforementioned disadvantages in that the cover film initially needs to be removed at the construction site before the tubular end of the fluid line can be inserted into the annular gap to produce the glued joint.

SUMMARY OF THE INVENTION

The present invention is directed to the filling of an annular gap with a suitable adhesive in such a way that a coupling element can be rapidly and easily connected to the end section of a fluid line.

The objective is attained by filling an annular gap between an inner tube and an outer tube with a dry hot-melt adhesive that is compacted into the shape of a solid ring.

A glued joint between the end of a fluid line and the coupling element can be produced in a much simpler and less expensive fashion than with the state of the art. Since the hot-melt adhesive is introduced into the gap in the form of a solid compacted ring, it can be retained therein without cover elements and reactivated for use at any time by applying heat. A method according to the invention makes it possible to easily connect fluid lines and coupling elements to one another. The method is particularly advantageous when the coupling element is constructed of a plastic material and the fluid line is constructed of an aluminum tube or a metal tube that is encased with plastic as is increasingly utilized in modern technology.

The invention also teaches various advantageous additional developments that serve for achieving the individual advantages described below.

Specifically, the design of the inner tube serves for producing a centered contact with the end section of the fluid line while the hot-melt adhesive is able to distribute between longitudinal ribs.

The design of the outer tube makes it possible for the adhesive inserted between the inner tube and the outer tube to flow outward along the ribs when it is subjected to heat such that a uniform distribution of the adhesive is ensured.

Finally, a method for producing a glued joint advantageously describes how the ring of adhesive introduced into the annular gap can be rapidly heated while the fluid line is inserted, and how the end of the fluid line can be properly pressed into the melting adhesive.

BRIEF DESCRIPTION OF THE DRAWINGS

One preferred embodiment of the invention is illustrated in the figures and described in greater detail below, wherein:

FIG. 1 is a side view of a coupling housing with a partial section through a coupling element along the line I—I in FIG. 2;

FIG. 2 is a lateral section view through the coupling element along the line II—II in FIG. 1;

FIG. 3 is a longitudinal section view through a compacted adhesive ring to be inserted into an annular gap of the coupling element;

FIG. 4 is a schematic presentation of a coupling housing with an inserted adhesive ring;

FIGS. 5 and 6 are side views demonstrating a sequence of producing a glued joint between the coupling element and the fluid line; and FIG. 7 shows a side view of a finished glued joint between the fluid line and the coupling element.

DETAILED DESCRIPTION

Referring now to FIGS. 1 and 2, there is shown a tubular coupling element 1 that is integrally connected to a coupling housing 2. As indicated in FIG. 7, the coupling element 1 serves for producing a glued joint with a fluid line 3 that, for example, includes an aluminum tube or another suitable metal tube. The coupling element 1 may, however, also be integrally formed on a plug-in element (that is not illustrated in the figures) and conventionally inserted into the coupling housing 2 in order to produce a separable plug-type connection.

Still referring to FIGS. 1 and 2, the coupling element 1 includes an inner tube 4 that is inserted into a free end 20 of the fluid line 3 and an outer tube 5 that is concentric to the inner tube 4 and connected to the rear end of the inner tube 4 by a connecting wall 6. An outer surface 7 of the inner tube 4 preferably includes at least three longitudinal ribs 8 that serve for producing a centered contact with the inner wall 9 of the fluid line 3 when it is pushed over the inner tube 4 (FIG. 6).

As seen in FIG. 2, the outer tube 5 is provided with a series of axially parallel grooves 10 having peaks 11 that are distributed over the inner surface of the outer tube 5. The inside diameter of the inner surface between opposing peaks 11 is slightly larger than the outside diameter D of the fluid line 3. The length of the outer tube 5 preferably corresponds approximately to the outside diameter D of the fluid line 3 such that the inner tube 4 is longer than the outer tube 5 by approximately one-half.

Referring now to FIGS. 1–3, to produce a glued joint between the tubular coupling element 1 and the fluid line 3, an annular gap 13 between the inner tube 4 and the outer tube 5 is filled with a hot-melt adhesive to approximately half its depth. The hot-melt adhesive is introduced into the annular gap 13 in the form of a compacted solid ring 14 (FIG. 3). The outside diameter D1 of the ring 14 is slightly smaller than the inside diameter d2 of the peaks 11, and the inside diameter d1 of the ring 14 corresponds approximately to an inside diameter d of the fluid line 3. The width B of the ring 14 has such dimensions that the ring 14 fills out approximately half the depth of the annular gap 13.

Referring now to FIGS. 3 and 4, upon inserting the ring 14 into the annular gap 13 in the direction of the arrow P, the ring 14 is pressed into the gap 13 until it contacts the connecting wall 6 (FIG. 4). The ring 14 is preferably pressed into the gap 13 with the aid of an auxiliary tool 15 that contains circumferentially distributed pressing elements 16. Following insertion of the ring 14, the coupling element 1 is ready for gluing to the free end 20 of the fluid line 3.

As shown in FIGS. 5–7, the coupling housing 2 is initially held in position with a coupling holder 17 while the fluid line 3 is moved into a position opposite the coupling housing 2 axis through the use of a tube holder 18. An induction coil 19 is then placed around the free end 20 of the fluid line 3 such that the tubular end 20 of the fluid line is preheated (FIG. 5).

The coupling element 1 is pressed on the free end 20 of the fluid line 3 in the direction of the arrow M by means of the holder 17 and is surrounded by the induction coil 19. The adhesive ring 14 melts due to the thermal effect generated by the induction coil. While the tubular end 20 of the fluid line 3 penetrates into the hot-melt adhesive, the adhesive is displaced on the inner wall 9 and the outer wall 12 along the ribs 8 and the grooves 10 in the inserting direction M. This causes the intermediate spaces between the tubular end 20 of the fluid line and the coupling element 1 to be completely filled out with the hot-melt adhesive (FIG. 6).

After the hot-melt adhesive has set and pre-hardened, the process of connecting the coupling element 1 and the fluid line 3 is concluded such that the holders 17 and 18 can be removed and the adhesive permitted to cure (FIG. 7). The coupling 2 with the fluid line 3 glued thereto can then be transported to the site of its intended use.

In the embodiment shown, the tube holder 18 is shown as a solid body with a blind hole into which the fluid line 3 is inserted with its outgoing end. However, the tube holder may also include a clamping element that surrounds the fluid line 3, e.g., a pipe clamp. This is particularly advantageous if the fluid line 3 has a greater length than shown in FIGS. 5 and 6.

We claim:

1. A tubular coupling element for producing a glued joint with a fluid line, said tubular coupling element comprising:
   an inner tube having a front end and a rear end, wherein said front end is insertable into a fluid line;
   an outer tube having a front end and a rear end, wherein said outer tube is concentric to said inner tube and a length of the front end of said inner tube is longer than a length of the front end of said outer tube;
   a linear connecting wall interconnecting said inner tube rear end to said outer tube rear end, wherein said outer tube, said connecting wall and said inner tube define one cylindrically shaped annular gap; and
   a solid ring of hot melt adhesive disposed within the annular gap and positioned against said connecting wall, such that said solid ring of hot melt adhesive occupies less than the full volume of the annular gap.

2. The tubular coupling element of claim 1, wherein said inner tube further includes an outer surface, having a plurality of longitudinal ribs for producing a centered contact with an inner wall of the fluid line.

3. The tubular coupling element of claim 1, wherein said outer tube further includes an inner surface having a plurality of axially parallel grooves distributed over a circumference of said inner surface, wherein said grooves have peaks with an inside diameter that is larger than an outside diameter of the fluid line.

4. The tubular coupling element of claim 1, wherein a length of said outer tube is approximately equal to an outside diameter of the fluid line and said inner tube is longer than said outer tube by about one-half the length of said outer tube.

5. A tubular coupling element for producing a glued joint with a fluid line, said tubular coupling element comprising:
   an inner tube having a front end and a rear end, wherein said front end is insertable into a fluid line;
   an outer tube having a front end and a rear end, wherein said outer tube is concentric to said inner tube and a length of the front end of said inner tube is longer than a length of the front end of said outer tube;
   a linear connecting wall interconnecting said inner tube rear end and said outer tube rear end, wherein said outer tube, said connecting wall and said inner tube define one cylindrically shaped annular gap; and
   a solid ring of hot melt adhesive disposed within the annular gap and positioned against said connecting wall, wherein said solid ring of hot melt adhesive fills approximately one-half a depth of the annular gap.

6. A tubular coupling element for producing a glued joint with a fluid line, said tubular coupling element comprising:
   an inner tube having a front end and a rear end, wherein said front end is insertable into a fluid line;
   an outer tube having a front end and a rear end and an inner surface having a plurality of axially parallel grooves distributed over a circumference of said inner surface, wherein said outer tube is concentric to said inner tube;
   a linear connecting wall interconnecting said inner tube rear end to said outer tube rear end, wherein said outer tube, said connecting wall and said inner tube define one cylindrically shaped annular gap; and
   a solid ring of dry hot-melt adhesive disposed within the annular gap and positioned against said connecting wall, wherein said solid ring of adhesive fills about one-half a depth of the annular gap.

7. A tubular coupling element for producing a glued joint with a fluid line, said tubular coupling element comprising:
   an inner tube that is insertable into the fluid line wherein said inner tube includes a front end and a rear end, and an outer surface having a plurality of longitudinal ribs for producing a centered contact with the fluid line;
   an outer tube having a front end and a rear end and having an inner surface having a plurality of axially parallel grooves distributed over a circumference of said inner surface, said grooves having peaks with an inside diameter that is larger than an outside diameter of the fluid line, wherein said outer tube is concentric to said inner tube;
   a linear connecting wall interconnecting said inner tube rear end to said outer tube rear end, wherein said outer tube, connecting wall and said inner tube define one cylindrically shaped annular gap; and
   a solid ring of dry hot-melt adhesive disposed within the annular gap and positioned against said connecting wall, wherein said solid ring of adhesive fills about one-half a depth of the annular gap.

8. A method for producing a glued joint between a tubular coupling element and a fluid line, said method comprising the steps of:
- providing a tubular coupling element including an inner tube having a front end and a rear end, and the front end is insertable into a fluid line, a connecting wall secured to the inner tube rear end and an outer tube having a front end and a rear end, and extending from the connecting wall, wherein the outer tube is concentric to the inner tube, and the inner tube, outer tube and connecting wall define an annular gap;
- providing a solid ring of hot melt adhesive;
- pressing the solid ring of adhesive in the annular gap against the connecting wall, wherein the solid ring of adhesive fills about one-half the annular gap;
- applying heat to the tubular coupling element so as to melt the solid ring of adhesive;
- inserting a free end of the fluid line into the melting adhesive in the annular gap such that the melting adhesive flows around the free end of the fluid line to fill an intermediate space between the free end of the fluid line and the coupling element.

9. The method of claim 8, wherein the solid ring of adhesive has an inside diameter corresponding to an inside diameter of the fluid line, and an outside diameter slightly smaller than an inside diameter of the outer tube.

10. The method of claim 8, further comprising the steps of using an induction coil to preheat a free end of the fluid line and melt the solid ring of adhesive.

11. The method of claim 10, wherein the free end of the fluid line is pushed onto the coupling element together with the induction coil.

12. A method for producing a glued joint between a tubular coupling element and a fluid line, said method comprising the steps of:
- providing a tubular coupling element including an inner tube having a front end, a rear end, and an outer surface, and the front end is insertable into a fluid line, wherein the outer surface includes a plurality of longitudinal ribs for producing a centered contact with an inner wall of the fluid line, a connecting wall is secured to the rear end of the inner tube, and an outer tube having a front end and a rear end extending from the connecting wall that is concentric to the inner tube and has an inner surface including a plurality of axially parallel grooves distributed over a circumference of the inner surface, wherein the outer tube, inner tube and connecting wall define an annular gap;
- providing a solid ring of hot melt adhesive;
- pressing the solid ring of adhesive in the annular gap against the connecting wall, wherein the solid ring of adhesive fills about one-half the annular gap;
- applying heat to the tubular coupling element so as to melt the solid ring of adhesive; and
- inserting a free end of the fluid line into the melting adhesive in the annular gap such that the melting ring of adhesive flows around the free end of the fluid line such that a small portion of the adhesive flows between the fluid line and the inner tube and a predominant portion of the adhesive flows between the fluid line and the outer tube.

13. The method of claim 12, wherein the solid ring of adhesive has an inside diameter corresponding to an inside diameter of the fluid line, and an outside diameter slightly smaller than an inside diameter of the outer tube.

14. The method of claim 12, further comprising the steps of using an induction coil to preheat a free end of the fluid line and melt the solid ring of adhesive.

15. The method of claim 14, wherein the free end of the fluid line is pushed onto the coupling element together with the induction coil.

* * * * *